US005466475A

United States Patent [19]
Yamasaki et al.

[11] Patent Number: 5,466,475
[45] Date of Patent: Nov. 14, 1995

[54] METHOD OF FRYING NOODLES

[75] Inventors: Masahiro Yamasaki; Masaru Chiba, both of Shiga; Takashi Yokogoshi, Kyoto; Kenji Kodama; Tatsuo Yamaya, both of Shiga; Masakazu Yokoyama, Osaka, all of Japan

[73] Assignee: Nissin ShokuhinKabushiki Kaisha, Osaka, Japan

[21] Appl. No.: 64,509

[22] Filed: May 19, 1993

[30] Foreign Application Priority Data

May 21, 1992 [JP] Japan ................................ 4-128487

[51] Int. Cl.⁶ .................................................... A23L 1/16
[52] U.S. Cl. .................................... 426/439; 426/451
[58] Field of Search ................................. 426/439, 451

[56] References Cited

U.S. PATENT DOCUMENTS

| 3,997,676 | 12/1976 | Ando ................................. 426/439 |
| 4,166,139 | 8/1979 | Ishida ................................ 426/439 |
| 4,182,230 | 1/1980 | Sakurazawa ...................... 426/439 |
| 4,185,125 | 1/1980 | Sakakibara et al. .............. 426/439 |

FOREIGN PATENT DOCUMENTS

| 2351600 | 12/1977 | France . |
| 60-227647 | 11/1985 | Japan . |
| 4-262729 | 9/1992 | Japan . |
| 2147798 | 5/1985 | United Kingdom . |

Primary Examiner—Jeanette Hunter
Assistant Examiner—Mary S. Mims
Attorney, Agent, or Firm—Marshall, O'Toole, Gerstein, Murray & Borun

[57] ABSTRACT

A method for filling the noodles into a fry retainer during the production of the noodles, wherein the noodles are disentangled and are uniform so that the frying of the noodles is entirely and uniformly carried out without maldistribution from the outside of the brick to the center thereof, and the noodles are given a fine quality and form. Noodles having a fixed length are placed into the fry retainer and a pressure member creates downward pressure on the noodles in the retainer.

4 Claims, 3 Drawing Sheets

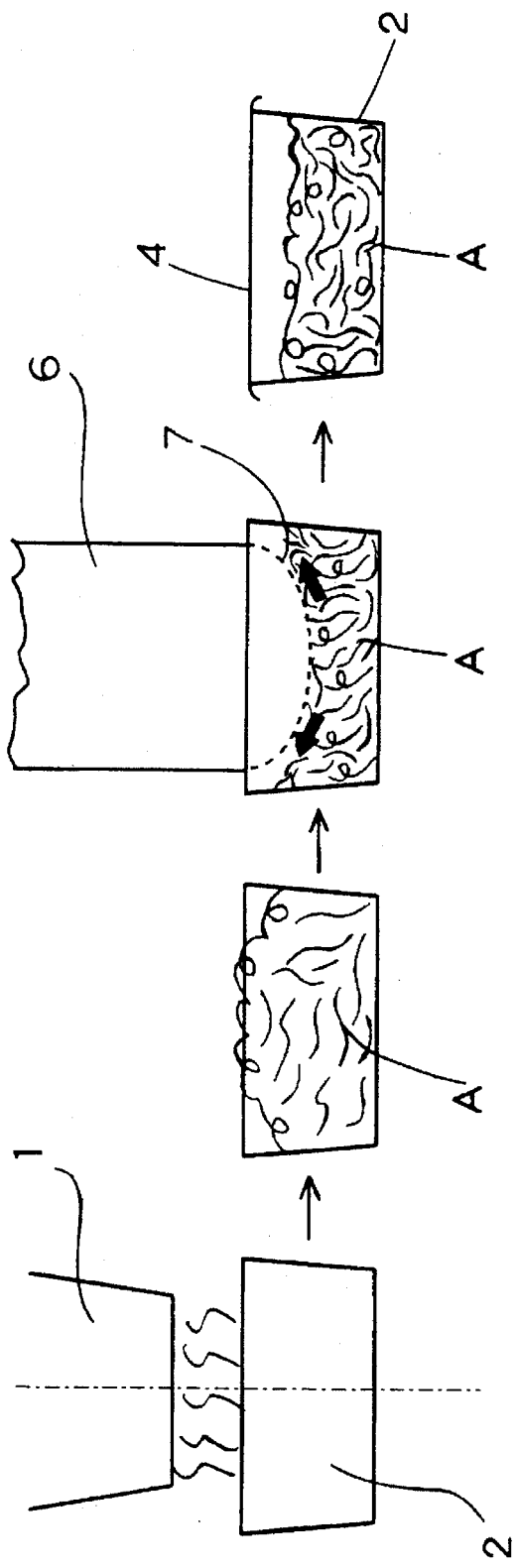

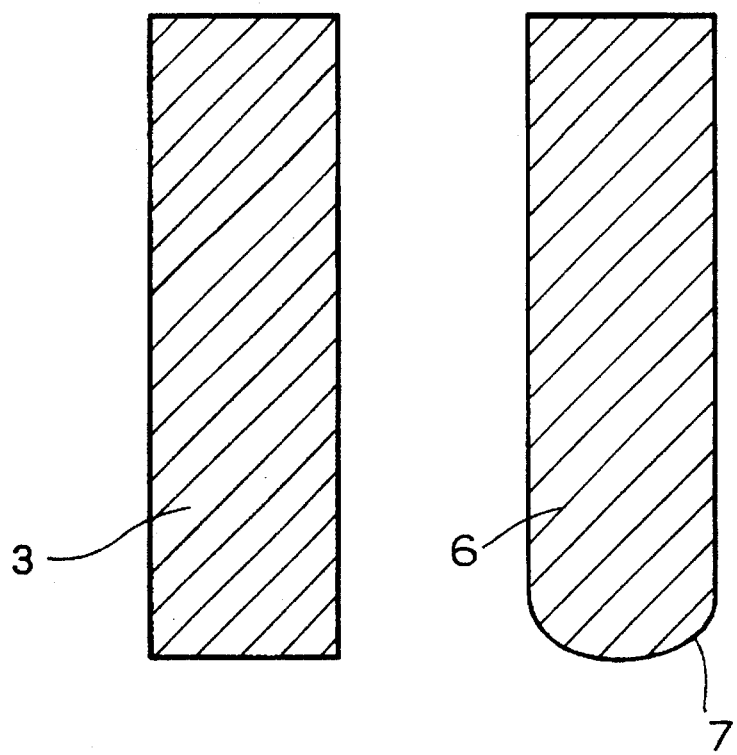
Fig. 3(a)    Fig. 3(b)
Fig. 4
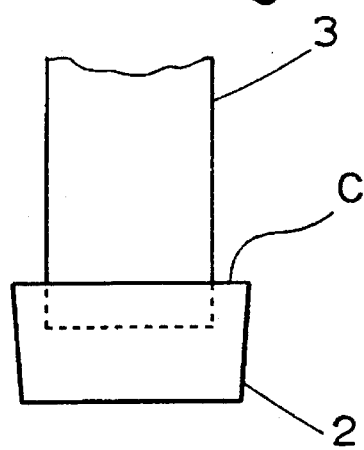

METHOD OF FRYING NOODLES

BACKGROUND OF THE INVENTION

The present invention relates to a method for producing instant noodles, and more particularly to, in the pre-step of the frying stage, a method for filling noodles having a fixed length into a frying vessel (hereinafter referred to as a "fry retainer").

Conventionally, instant noodles are prepared by forming the noodles into a line, after kneading the constituent materials such as flour, water, kansui or the like to form a noodle dough, and then extruding the noodle dough. Then, after steaming the lines of noodles, the noodles are cut by a cutter to have a fixed length and are packed into a fry retainer and immersed (for fry treatment) in a heated oil. Thereafter, the fried noodles are appropriately cooled.

In this process, after the noodles are cut to the fixed length and are ready to be packed into the fry retainer, it is important to disentangle the noodles and to distribute the noodles uniformly, so that they are entirely and uniformly fried at the next step and so that a brick of high-quality fried noodles is produced.

In other words, when the line of noodles is packed into the fry retainer, if the disentanglement of the line is insufficient and if the distribution thereof is not uniform, the frying treatment is not uniform and the center portion of the brick of the noodles is insufficiently fried and fallen (the so-called "under-done" situation). On the other hand, the surface portion of the brick becomes excessively fried. Further, there are the problems when the lines of noodles is maldistributed, that the shape form of the produce is poor, and in addition thereto, when adding the hot water at the time of cooking, the reconstitution of the dense center portion of the brick is obstructed and the noodles are hard to eat.

To eliminate the aforementioned problems, conventionally, there is the method, as disclosed in the Japanese Patent Provisional Publication No. 56-5062, for placing the noodles into the vessel by dropping the noodles, cut to the fixed length, through a shooter, spraying the pressurized air as they are falling, blowing it off in the horizontal direction of the L-shaped shooter and falling to the vertical direction of the shooter at the end of the opposite lateral wall. There is the further conventional method, as disclosed in the Japanese Patent Provisional Publication No. 62-294053, for flowing and uniformly distributing the noodles by placing predetermined amounts of the noodles into the vessel, closing the upper opening of the vessel with movable lids, inserting the nozzle mounted on the lids into the noodles and shooting the air radially from the inserted nozzle for disentangling the noodles. Further, there was the method of using a stick for uniformly filling the noodles into the vessel by vibrating the stick.

However, in the method for spraying the air or the method for moving the noodles by vibrating the stick, scattering of the noodles from the fry retainer would often result, whereby the operation of the automated production line might be inhibited. In addition thereto, the weights of the bricks of the noodles were not uniform, and therefore it might not be distributed as a product.

Further, when using the method of vibrating a stick, the noodles are apt to be twisted and damaged, and are hard to fry uniformly in the frying step. Further, in the conventional method of spraying the air or vibrating the stick, there are problems of installing the necessary apparatus having a complicated and large-scale construction.

In view of the above problems in the prior art, a primary object of the present invention is to provide a method, in the production of instant noodles, for filling the noodles wherein the distribution of the noodles is entirely uniform, whereby the frying of the noodles is entirely and uniformly carried out without maldistribution from the surface of the brick of the noodles to the center thereof, and whereby the quality and the form of the noodles of the obtained fried brick are satisfactory and is easy to cook by adding the hot water.

Further, an object of the present invention is to provide a method for filling the noodles in a fry retainer and not causing the noodles to scatter from the fry retainer, whereby, the operation of the automated production line is not inhibited and the weight of the brick of the noodles is uniform, and in addition thereto, the noodles are not scuffed and damaged.

Further, an object of the present invention is to provide a method for filling the noodles in a fry retainer using apparatus having a simple structure and not requiring large-scale apparatus.

SUMMARY OF THE INVENTION

The present invention accomplishes the objects by placing the noodles, cut to the fixed length, into a fry retainer and pressing downwardly on the cut noodles which are held in the fry retainer.

The present invention is also characterized in that the noodles are pressed downwardly through a pressure member by descending the pressure member into the fry retainer at the time of said pressing.

Further, the present invention of filling the noodles is characterized that the outer dimension of the pressure member is smaller than an inner dimension of the fry retainer.

BRIEF DESCRIPTION OF THE DRAWINGS

The invention will be better understood from the following detailed description taken in conjunction with the accompanying figures of the drawings, wherein:

FIGS. 2(a), 2(b), 2(c), and 2(d) are schematic views showing the steps of an alternative embodiment of the present invention;

FIG. 3A is a vertical sectional view of a pressure member used in the filling method according to the present invention;

FIG. 3B is a vertical sectional view of an alternative pressure member; and

FIG. 4 is a schematic view showing the difference in the sizes of the fry retainer and the pressure member used in the filling method according to the present invention.

DETAILED DESCRIPTION OF THE INVENTION

Figures 1A, 1B, 1C, 1D:
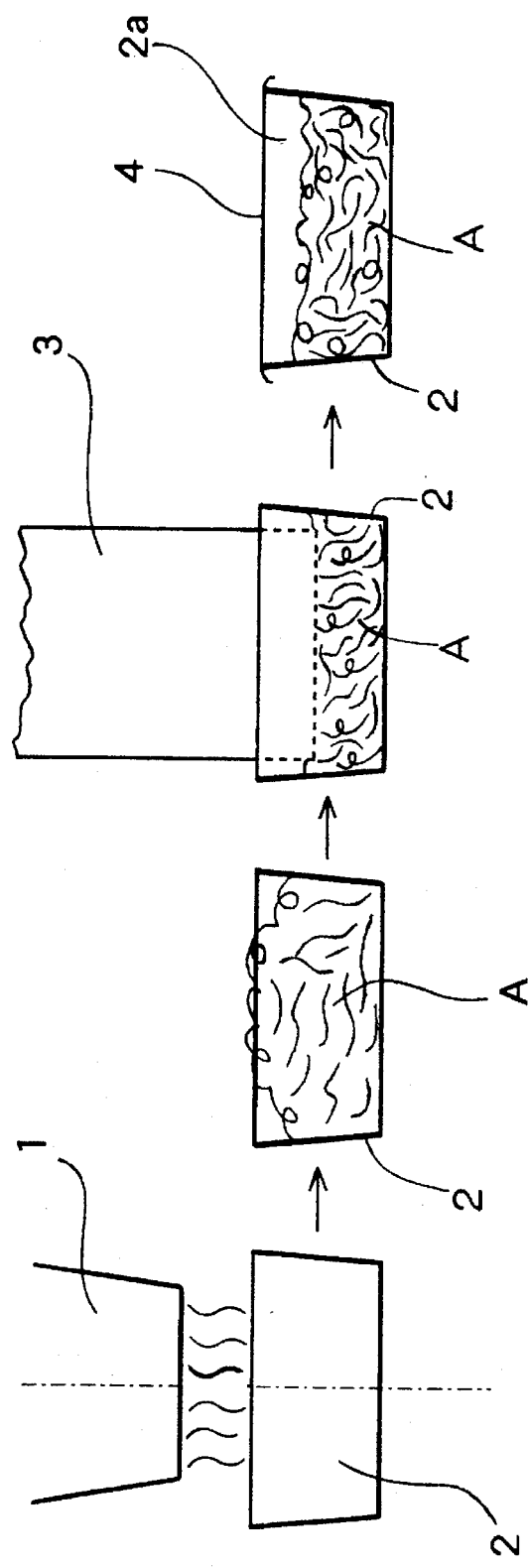
FIGS. 1(a), 1(b), 1(c), and 1(d) are schematic views showing the steps of a filling method in accordance with the present invention.

In the present invention, as in the prior art method, the noodles are first prepared by kneading the materials, such as the flour, the water, the kansui or the like, forming the noodle dough, pressuring the noodle dough and forming the noodles with a cutting roll. After steaming the noodles, the noodles cut into fixed lengths and weighed into predetermined amounts. Then, as shown in FIG. 1(a), the noodles A are dropped into a fry retainer 2 from the hopper 1 of a conventional cutting-throwing device to produce a filled fry retainer as shown in FIG. 1(b).

Then, as shown in FIG. 1(c), the noodles A in the fry retainer 2 are uniformly packed in the fry retainer 2 by descending downwardly and vertically a cylindrical pressure member 3 which is shaped as shown in FIG. 3A.

Then the noodles A contained in the fry retainer 2 are fried, as shown in FIG. 1(d), by closing the upper opening of the fry retainer 2 with a lid 4, immersing the retainer into an oil vat (not shown) containing the heated cooking oil and allowing the oil to flow into the retainer 2 around the noodles A through a plurality of holes (not shown) formed in the bottom of the fry retainer 2.

As discussed previously, by pressing downwardly and vertically on the noodles A held in the fry retainer 2 using the pressure member 3, prior to the frying step, the noodles in the center portion of the retainer, which would otherwise be apt to become half-cooked at the frying step, are pressed down causing the noodles to be spread downwardly and out on all sides, whereby an entirely uniform distribution is obtained.

Further, by pressing the noodles A, a space 2a is formed between the upper portion of the noodles A held in fry retainer 2 and the lid 4 as shown in FIG. 1(d), whereby, the portion of the noodles swelling during the frying is increased.

Accordingly, the noodles A pressed as described above and held in the fry retainer 2 come to have an entirely uniform distribution both vertically and horizontally of the noodles, whereby, the frying of the noodles is entirely and uniformly carried out during the frying of the next step without maldistribution from the surface of the brick of the noodles to the center thereof, and a fine quality and form of the brick of noodles are obtained.

As shown in FIG. 4, it is preferable that the diameter of the pressure member 3 is substantially smaller than the internal diameter of the retainer 2, forming a space C between the member 3 and the wall of the retainer 2. Thus the noodles A uniformly flow downwardly and out on all sides of the member 3 in the fry retainer 2 and into the space C.

Further, as a mechanism for moving vertically the pressure member 3, a conventional mechanism (not illustrated), for example, a pneumatic piston-cylinder mechanism, can be used, although other mechanisms may be used instead. In addition, shown in FIGS. 2(a), 2(b), 2(c), and 2(d) is a second example of the present invention which is substantially similar to that of FIGS. 1(a), 1(b), 1(c), and 1(d). The difference is in the form of the pressure member 6 and the edge 7 of the bottom end of the pressure member 6 which is semi-spherical. During the pressing of the noodles A held in the fry retainer 2 [see FIG. 2(c)], the dense center portion of the noodles is pressed out on all sides of the member 6 and around the curved edge 7 and this shape is able to distribute the noodles more uniformly.

Example 1

After placing the noodles, such as #24 square, 1.25 mm pitch, and 15 cm (in other words, noodles which have 15 cm length and have been cut with a #24 cutter to have 1.25 mm width) manufactured by the ordinary method, into the fry retainer, each frying step is conducted with (Method 1) a cylindrical pressure member 3 of 45.0 mm diameter and 150.0 mm length, and (Method 2) the pressure member 6 being formed semi-cylindrical with a radius of 18 mm at the bottom end and an upper diameter of 45 mm, (the space C between the upper opening of the retainer 2 and the pressure member 3 or 6 is 9.25 mm).

At that time, with a pressing time of two seconds (the required time for pressing the pressure member 20 mm downwardly from the upper opening of the retainer), the press stroke being 20 mm (the distance between the upper opening of the retainer 2 and the top surface of the noodles A), and 155° C., two minutes of the frying condition are respectively set.

The preparation sequence is 1) the noodles are placed in the fry retainer; 2) the noodles are pressed using the pressure member; 3) the pressure member is removed; 4) the lid is placed on the fry retainer; 5) the fry retainer is placed in the cooking oil and the noodles are fried; 6) the fry retainer is removed from the cooking oil; and 7) the lid is removed and the noodles are removed from the fry retainer.

TABLE

|  | Conventional Method | Method (1) | Method (2) |
| --- | --- | --- | --- |
| Press Stroke (mm) | — | 20 | 20 |
| Press Time (Sec.) | — | 2 | 2 |
| Number of Samples | 24 | 24 | 24 |
| Number of Half-Fried Samples | 9 | 0 | 0 |
| Number of Uneven-Fried Portions | 6 | 2 | 0 |
| Number of Normal Products | 9 | 22 | 24 |

It will be apparent from the results shown in Table 1, in comparison with the conventional method, that to fry the noodles A pressed and packed with the pressure member 3 or 6 into the retainer 2, the method of the present invention is better in achieving uniformly packed portions and conducting the frying treatment uniformly. Further, as shown in FIGS. 2(C) and 3B, a remarkable effect will be derived when the form of the pressure member is entirely spherical or, at least, the bottom end margin thereof is semi-spherical (formed with a radius).

The sizes of the fry retainer and the pressure member are dependent on the quantity of noodles to be cooked which in turn depends on the nature of the product to be produced. The following relationships apply:

1) The ratio of the diameter of the pressure member to the inner diameter of the fry retainer is in the range of from approximately 50% to less than 100%

2) The ratio of the volume of the fried noodles to the volume of the fry retainer is approximately 0.3 g/cm$^3$ or less.

According to the method of the present invention, a batch of noodles held in the fry retainer is vertically and downwardly pressed with the pressure member and the center portion of the batch, which is apt to be half-fried, is pressed at the time of the frying step, whereby, the distribution of the noodles is spread and becomes uniform on both sides and vertically. Further, by firmly pressing the noodles held in the fry retainer, a space between the upper portion of the noodles and the lid is formed, whereby, the space for noodles to spread or swell becomes large at the frying step.

Accordingly, the distribution of the noodles pressed as described above and held in the fry retainer becomes uniform on all sides and in the vertical direction, whereby, the frying of the noodles is entirely and uniformly carried out in the frying of the next step without maldistribution from the surface of the brick portion of the noodles to the center thereof, and the fine quality and form of the noodles are obtained.

Further, in the filling method of the present invention wherein the noodles are pressed with the pressure member having, at the least, a bottom end thereof which is semi-spherical (formed with a radius), when the noodles held in the fry retainer were pressed, the dense center portion of the noodles is squeezed out along with the spherical edge of the stick, whereby a uniform filling is possible.

Consequently, the instant noodles produced by the method of the present invention may be reconstituted easily and be cookable simply by adding hot water at the time of eating.

Further, according to the present invention, scattering of the noodles from the fry retainer is not caused, whereby, the operation of an automated production line might not be held up. In addition, the weight of the brick of the noodles is uniform; therefore the filling method prevents scuffing and damaging the noodles at the time of filling in containers.

Further, the present invention provides excellent advantages having numerous positive effects derived from the filling method using apparatus having a simple structure and not requiring the large-scale apparatus.

What is claimed is:

1. A method for filling noodles cut to a fixed length into a fry retainer, comprising the steps of;

placing the cut noodles into a fry retainer, and pressing downwardly on the top of the noodles held in said fry retainer and forming a space between an upper portion of the noodles and a lid of said fry retainer by means of a pressure member having an outer dimension which is smaller than an inner dimension of said fry retainer, by descending said pressure member into said fry retainer against the noodles.

2. A method according to claim 1, wherein said space is formed by pressing downwardly with the flat bottom end of said pressure member.

3. A method according to claims 1 or 2, wherein said space is formed by pressing downwardly with the semi-spherical bottom end of said pressure member.

4. A method for filling noodles cut to a fixed length into a fry retainer, comprising the steps of:

placing said cut noodles into said fry retainer;

pressing downwardly on the top of said cut noodles held in said fry retainer with a pressure member having an outer dimension which is smaller than an inner dimension of said fry retainer by descending said pressure member into said fry retainer against said cut noodles; and before beginning to fry said cut noodles, removing said pressure member from said fry retainer.

* * * * *